(12) United States Patent
Green

(10) Patent No.: US 11,608,928 B1
(45) Date of Patent: *Mar. 21, 2023

(54) COLLAPSIBLE PLUG FOR DOWNSPOUTS

(71) Applicant: Robert Green, Lakewood, CO (US)

(72) Inventor: Robert Green, Lakewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,411

(22) Filed: Mar. 27, 2020

Related U.S. Application Data

(63) Continuation of application No. 16/149,767, filed on Oct. 2, 2018, now Pat. No. 10,605,395.

(51) Int. Cl.
*F16L 55/11* (2006.01)
*E04D 13/08* (2006.01)

(52) U.S. Cl.
CPC .............. *F16L 55/11* (2013.01); *E04D 13/08* (2013.01)

(58) Field of Classification Search
CPC ................................ F16L 55/11; E04D 13/08
USPC .... 138/89; 220/254.1, 254.3, 212, 780, 801, 220/796, 254.7, 259.1; 229/125.09, 229/125.08, 114; 215/355, 228, 362, 215/358; 137/357
See application file for complete search history.

(56) References Cited

U.S. PATENT DOCUMENTS 10,605,395 B1 * 3/2020 Green .................. E04D 13/076
2016/0288948 A1 * 10/2016 Kiefer ................ B65D 81/3876

* cited by examiner

*Primary Examiner* — Craig M Schneider
*Assistant Examiner* — David R Deal
(74) *Attorney, Agent, or Firm* — Sheridan Ross P.C.

(57) ABSTRACT

A one-piece shield for temporarily covering the upper inlet of a downspout. The shield includes a single sheet of resilient material, with a pair of tabs that cooperate with a slot in the sheet. The sheet is rolled up to create a tubular portion. One of the tabs is turned into the tubular portion to block the passage into the tubular portion, and the other tab cooperates with the slot to keep the device rolled up, so that the tubular portion blocks entry of debris into the downspout. The device is unrolled after use, and stored flat.

19 Claims, 2 Drawing Sheets

COLLAPSIBLE PLUG FOR DOWNSPOUTS

REFERENCE TO RELATED APPLICATIONS

This application is a continuation of and claims priority to U.S. patent application Ser. No. 16/149,767, filed Oct. 2, 2018, entitled "COLLAPSIBLE PLUG FOR DOWNSPOUTS," now U.S. Pat. No. 10,605,395, issued Mar. 31, 2020.

BACKGROUND OF THE INVENTION

(a) Field of the Invention

This application relates to a system and method for preventing entry of debris into rain gutter downspouts while installing roofs on at a residence or commercial building that has downspouts. More particularly, but not by way of limitation, to a collapsible, temporary, device that creates a highly visible plug in the inlet of the downspout in order to prevent roofing materials being removed from clogging the downspouts while the roof is being replaced.

(b) Discussion of Known Art

There are many known devices that are used to keep leaves and similar debris from entering rain gutters, so that this debris does not reach the downspout. Also, there are screens and other accessible traps for collecting materials that have entered the downspout. However, these types of devices are positioned along the downspout, typically at a location near ground level, so that the debris can be removed without having to climb up to the rain gutters. Also, blocking the entrance of the downspout at its junction with the rain gutters will create a clogging problem that requires someone to climb to the rain gutter to clear the collected debris.

Therefore, a review of known devices reveals that there remains a need for a simple device that blocks material, particularly waste roofing material, from entering downspout while removing or installing roofing systems.

SUMMARY

It has been discovered that the problems left unanswered by known art can be solved by providing a collapsible plug that is formed from a sheet of flexible material, such as 1/32" plastic sheeting, and includes:

A flexible generally rectangular body having a lower section having a lower edge, a pair of side edges that extend up from the lower edge, an upper section having a right tab, a left tab, and a closure tab that is positioned between the right tab and the left tab. The right tab having a hooked section including an engagement slot, and the left tab having an engagement edge, so that rolling the rectangular body about an axis that is generally perpendicular to the lower edge and around the closure tab allows the engagement slot of the right tab to engage the body at a location immediately next to the left tab, so that the hooked section of the right tab cooperates with the engagement edge of the left tab to keep the device from unrolling, while at the same time securing the closure tab within the rolled up rectangular body.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
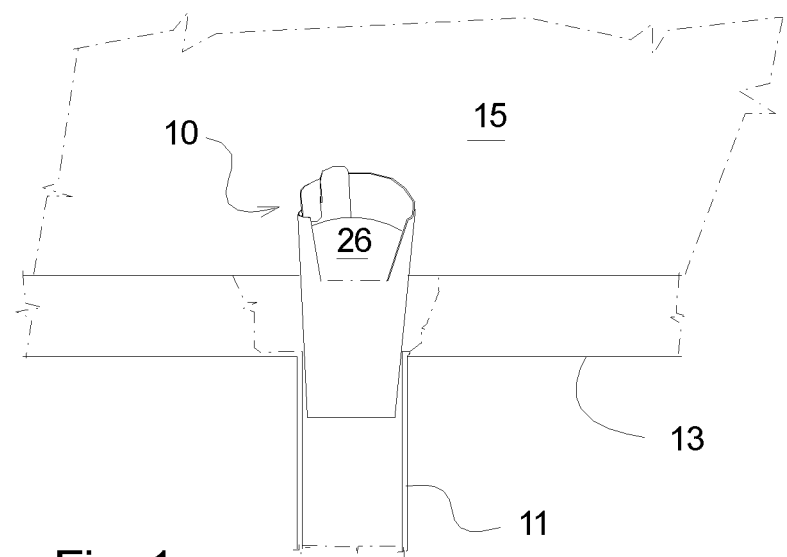
FIG. 1 is a perspective view of an embodiment of the invention shown while in use to plug the entrance of a downspout.
Figure 2:
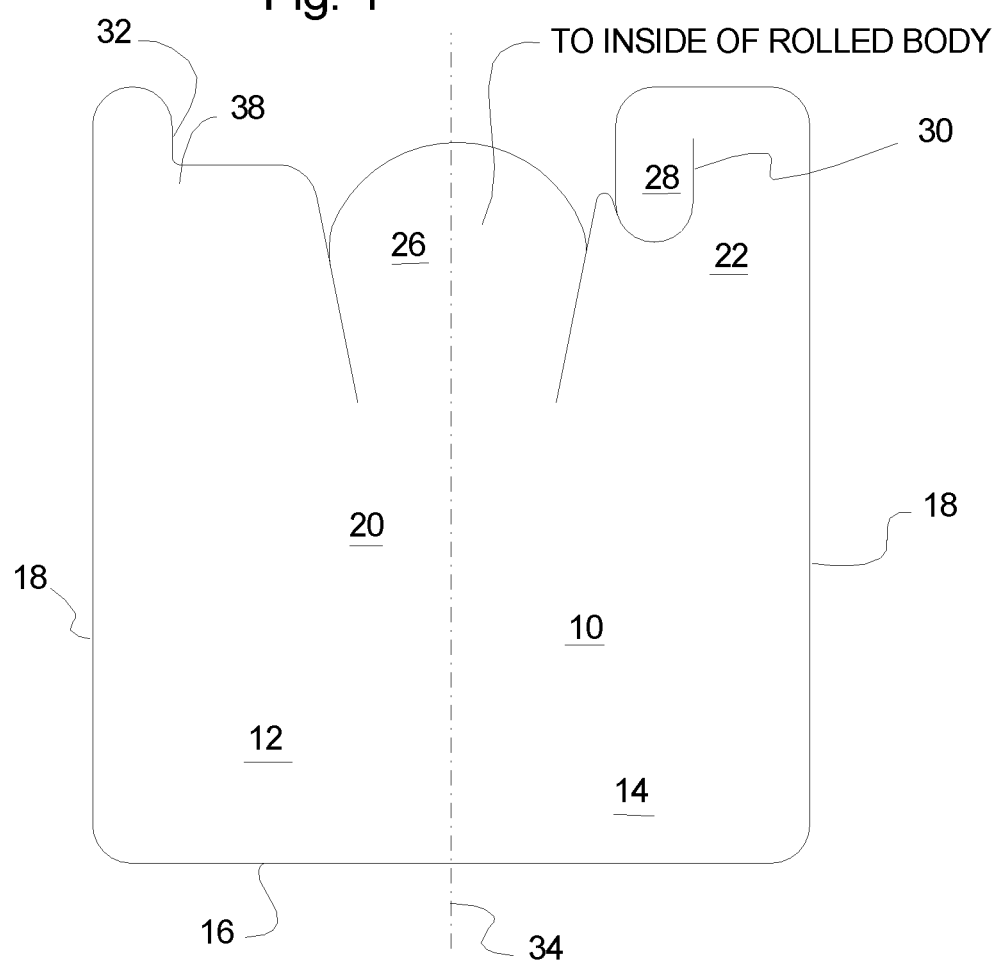
FIG. 2 is a plan view of a preferred example of the invention while lying flat.
Figure 3:
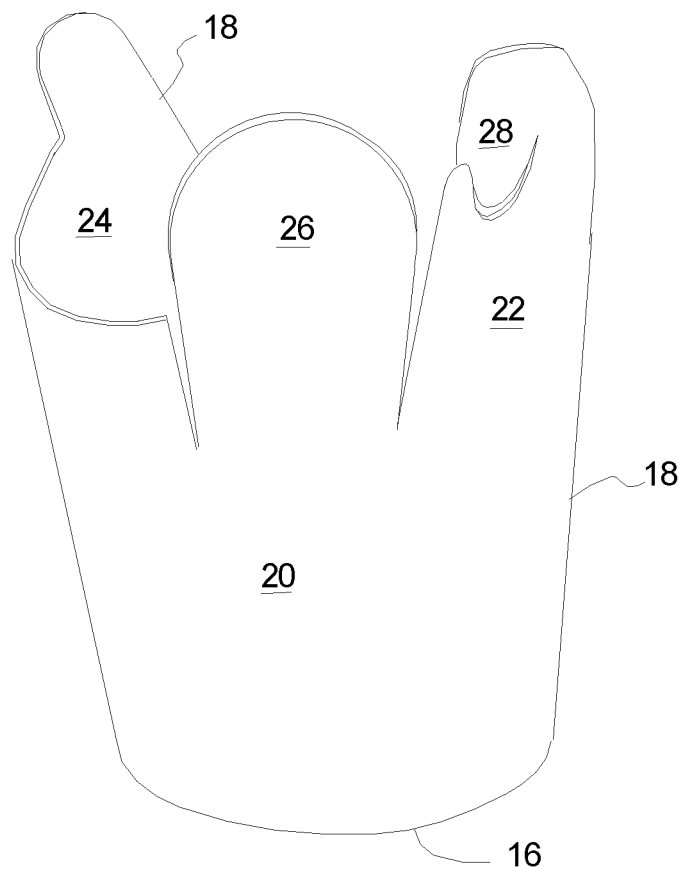
FIG. 3 is perspective view of the disclosed invention as it is being rolled up, before inserting into a downspout.

Turning now to FIG. 1 where the disclosed plugging device 10 for temporarily plugging the inlet of a downspout 11 attached to a gutter 13 attached to roof 15 that is undergoing installation of shingles or other roofing materials. In FIG. 2, the disclosed invention 10 has been shown as having a generally rectangular body 12, illustrated while lying flat. It is preferred that the plugging device 10 be made of a resilient sheet of plastic, such as 1/32" thick sheeting. The resiliency of the sheeting with enhance the cooperation of the components, so as to retain the rolled-up configuration and so as to allow the device to bias itself against the walls of the downspout, and be reused after a re-roofing project is completed.

It is also contemplated that the sheeting be of a highly visible color, such as red, or fluorescent orange or yellow. FIG. 2 also shows that the rectangular body 12 will preferably include a lower section 14 having a lower edge 16, a pair of side edges 18 that extend up from the lower edge 16. Additionally, the rectangular body 12 will have an upper section 20 with a right tab 22, a left tab 24, and a closure tab 26 that is positioned between the right tab 22 and the left tab 24.

Figure 4:
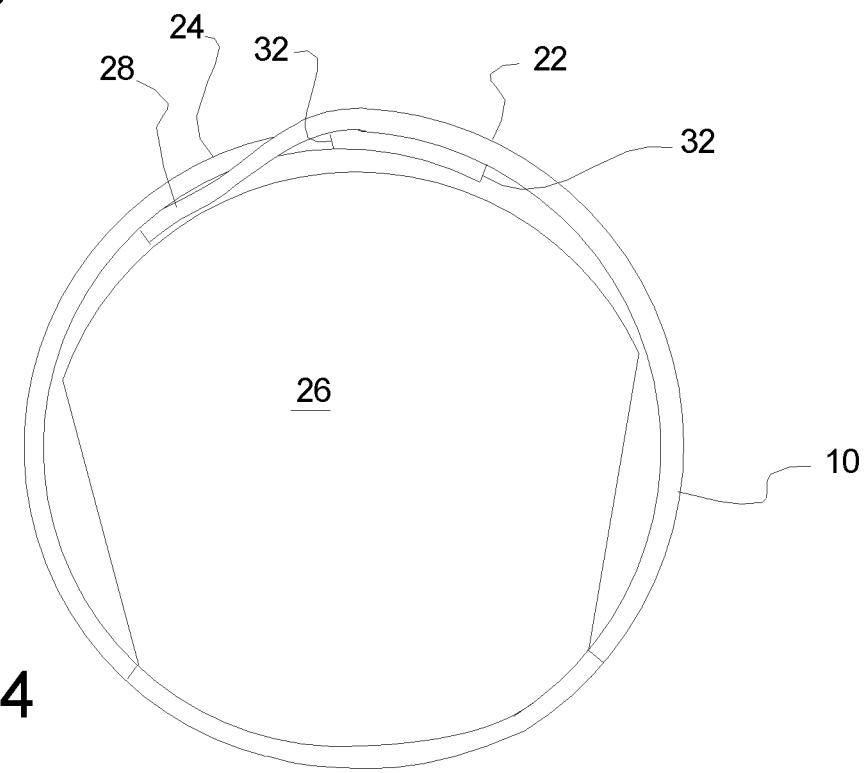
FIG. 4 is a view looking down at the disclosed invention prior to insertion into the downspout. The flexibility of the device would conform to the rectangular cross section commonly found in downspouts, when inserted into the downspout.

As shown in FIG. 2, the right tab 22 will have a hooked section 28 with an engagement slot 30. Additionally, the left tab 24 will having an engagement edge 32 that will cooperate with the hooked section 28 to retain the device in a rolled up arrangement as shown in FIG. 4, so that rolling the rectangular body about an axis 34 that is generally perpendicular to the lower edge 16 and around the closure tab 26 allows the engagement slot 30 of the right tab 22 to engage the rectangular body 12 at a location 38 that is immediately next to the left tab 24, so that the hooked section 28 of the right tab 22 cooperates with the engagement edge 32 of the left tab 24 to keep the device from unrolling, while at the same time securing the closure tab 26 between the right tab 22 and the left tab 24, within the rolled up rectangular body 12 as shown in FIGS. 1 and 4.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A device for temporarily protecting the inlet of a downspout from entry of debris, the device comprising:
   a generally rectangular body having a lower section having a lower edge, the rectangular body further having a pair of side edges that extend up from the lower edge;
   the generally rectangular body further having an upper section having a right tab, a left tab, and a closure tab, the closure tab being between the right tab and the left tab, the right tab having a hooked section including an engagement slot; and
   the left tab having an engagement edge, positioned such that rolling the rectangular body about an axis that is generally perpendicular to the lower edge and around the closure tab allows the engagement slot of the right tab to engage the body at a location immediately next to the left tab, so that the hooked section of the right tab cooperates with the engagement edge of the left tab, thereby keeping the device from unrolling, such that the closure tab is captured within the rolled up rectangular body, and thereby obstructing entry of debris past the closure tab, and into the rolled up rectangular body.

2. A device made from a flexible sheet of material, the device being useful for temporarily protecting the inlet of a downspout from entry of debris, the device comprising:
   a generally rectangular body having a lower section having a lower edge, the rectangular body further having a pair of side edges that extend up from the lower edge;
   the generally rectangular body further having an upper section having a right tab, a left tab, and a closure tab, the closure tab being between the right tab and the left tab, the right tab having a hooked section including an engagement slot; and
   the left tab having an engagement edge, positioned such that rolling the rectangular body about an axis that is generally perpendicular to the lower edge and around the closure tab allows the engagement slot of the right tab to engage the body at a location immediately next to the left tab, so that the hooked section of the right tab cooperates with the engagement edge of the left tab, thereby keeping the device from unrolling, such that the closure tab is captured within the rolled up rectangular body, and thereby obstructing entry of debris past the closure tab, and into the rolled up rectangular body.

3. A device for temporarily protecting an inlet of a downspout from entry of debris, the device comprising:
   a body comprising a first tab formed at a first side of the body, a second tab formed at a second side of the body opposite the first side, and a closure tab formed between the first tab and the second tab, the body being operable to transition between an unrolled configuration and a rolled configuration, the closure tab being operable to transition between an unfolded position and a folded position,
   wherein the first tab is operable to engage the second tab to retain the body in the rolled configuration and to retain the closure tab in the folded position, and wherein the closure tab is operable to prevent debris from entering into the downspout when in the folded position,
   wherein the first tab includes an engagement edge and the second tab includes a hooked section, and wherein the hooked section is operable to cooperate with the engagement edge to retain the body in the rolled configuration.

4. The device of claim 3, wherein an engagement slot of the second tab is operable to engage the body at a location proximate to the first tab when the body is in the rolled configuration.

5. The device of claim 3, wherein the engagement edge of the first tab is positioned between the second tab and the closure tab when the body is in the rolled configuration and the closure tab is in the folded position.

6. The device of claim 5, wherein a first surface of the first tab is in contact with a surface of the second tab when the body is in the rolled configuration, and wherein a second surface of the first tab opposite the first surface of the first tab is proximate to the closure tab when the body is in the rolled configuration and the closure tab is in the folded position.

7. The device of claim 3, wherein the hooked section of the second tab is positioned between the first tab and the closure tab when the body is in the rolled configuration and the closure tab is in the folded position.

8. The device of claim 7, wherein a first surface of the second tab is in contact with a surface of the first tab when the body is in the rolled configuration, and wherein a second surface of the second tab opposite the first surface of the second tab is proximate to the closure tab when the body is in the rolled configuration and the closure tab is in the folded position.

9. The device of claim 3, wherein the engagement edge includes a rounded end.

10. The device of claim 3, wherein the hooked section includes a rounded end, wherein the second tab includes a recess which conforms to the rounded end of the hooked section, and wherein the hooked section is positioned within the recess when the body is in the unrolled configuration.

11. The device of claim 3, wherein the closure tab includes an edge that partially conforms to an interior surface of a cavity, and wherein the interior surface is defined by at least one of the first tab or the second tab when the body is in the rolled configuration.

12. The device of claim 11, wherein one or more openings to the interior cavity are formed between the interior surface and the closure tab by the partial conforming of the closure tab edge to the interior surface, and wherein the closure tab edge partially conforming to the interior surface prevents debris from entering the inlet of the downspout and allows water to enter the inlet of the downspout.

13. The device of claim 3, wherein transitioning between the unrolled configuration and the rolled configuration includes wrapping the body about an axis defined approximately perpendicular to a lower edge of the body.

14. The device of claim 13, wherein the lower edge is approximately perpendicular to at least one of the first side and the second side.

15. The device of claim 13, wherein the first tab, the second tab, and the closure tab are each positioned proximal to an upper edge of the body opposite the lower edge.

16. The device of claim 15, wherein the body is substantially flat without an internal volume when in the unrolled configuration, and wherein the body forms a three-dimensional shape having an internal volume when in the rolled configuration.

17. The device of claim 16, wherein the three-dimensional shape includes a first width at the lower edge that is less than a second width at the upper edge opposite the lower edge.

18. The device of claim 3, wherein the device is formed from a flexible material, wherein the flexible material comprises a plastic.

19. The device of claim 18, wherein the plastic has a degree of resiliency which causes the body to bias against the downspout and retain the body in the rolled configuration.

\* \* \* \* \*